United States Patent
Hattersley

(10) Patent No.: US 9,702,686 B2
(45) Date of Patent: Jul. 11, 2017

(54) MULTIPLE MEASUREMENT CHANNEL DETECTOR CIRCUIT FOR INTERFEROMETERS

(75) Inventor: Simon Richard Hattersley, Bromley (GB)

(73) Assignee: Michelson Diagnostics Ltd (GB)

( * ) Notice: Subject to any disclaimer, the term of this patent is extended or adjusted under 35 U.S.C. 154(b) by 395 days.

(21) Appl. No.: 14/239,509

(22) PCT Filed: Aug. 8, 2012

(86) PCT No.: PCT/GB2012/051923
§ 371 (c)(1),
(2), (4) Date: Feb. 18, 2014

(87) PCT Pub. No.: WO2013/027013
PCT Pub. Date: Feb. 28, 2013

(65) Prior Publication Data
US 2014/0218745 A1    Aug. 7, 2014

(30) Foreign Application Priority Data
Aug. 19, 2011 (GB) ................................. 1114330.2

(51) Int. Cl.
*G01B 9/02* (2006.01)
(52) U.S. Cl.
CPC ..... *G01B 9/02055* (2013.01); *G01B 9/02004* (2013.01); *G01B 9/02027* (2013.01);
(Continued)
(58) Field of Classification Search
CPC ............ G01B 9/02055; G01B 9/02087; G01B 9/02041; G01B 9/02027; G01B 9/02091; G01B 9/02004; G01B 2290/45
See application file for complete search history.

(56) References Cited

U.S. PATENT DOCUMENTS

| 4,718,121 A | 1/1988 | Epworth |
| 5,134,276 A | 7/1992 | Hobbs |

(Continued)

FOREIGN PATENT DOCUMENTS

| WO | 2006053669 A1 | 5/2006 |
| WO | 2006054116 A2 | 5/2006 |
| WO | 2011116196 A1 | 9/2011 |

OTHER PUBLICATIONS

International Search Report for PCT/GB2012/051923 dated Nov. 26, 2012.
(Continued)

*Primary Examiner* — Hwa Lee
(74) *Attorney, Agent, or Firm* — Burns & Levinson, LLP

(57) ABSTRACT

A detector circuit for a multi-channel interferometer, typically as may be used in an optical coherence tomography device, comprising: a plurality of measurement channels (43) each comprising a measurement detector (31); and a balance channel (44) comprising a balance detector (30), each of the measurement detectors (31) and the balance detector (30) having a light sensitive area and an electrical output configured to output a signal indicative of the intensity of light incident on the light sensitive area, in which each measurement channel (43) is provided with a feedback circuit (40) comprising: a variable gain circuit (35) having an input for the signal from the measurement detector (31) and an output, the variable gain circuit (35) being configured to output at its output the signal received at its input with a variable level of gain; a difference circuit (38) having a first input for the output of the variable gain circuit (35), a second input for the signal from the balance detector (30) and an output, and being configured to output at its output a signal indicative of a difference of the signals at its first and second inputs; and a controller (36) for each variable gain circuit (Continued)

Figure 1:
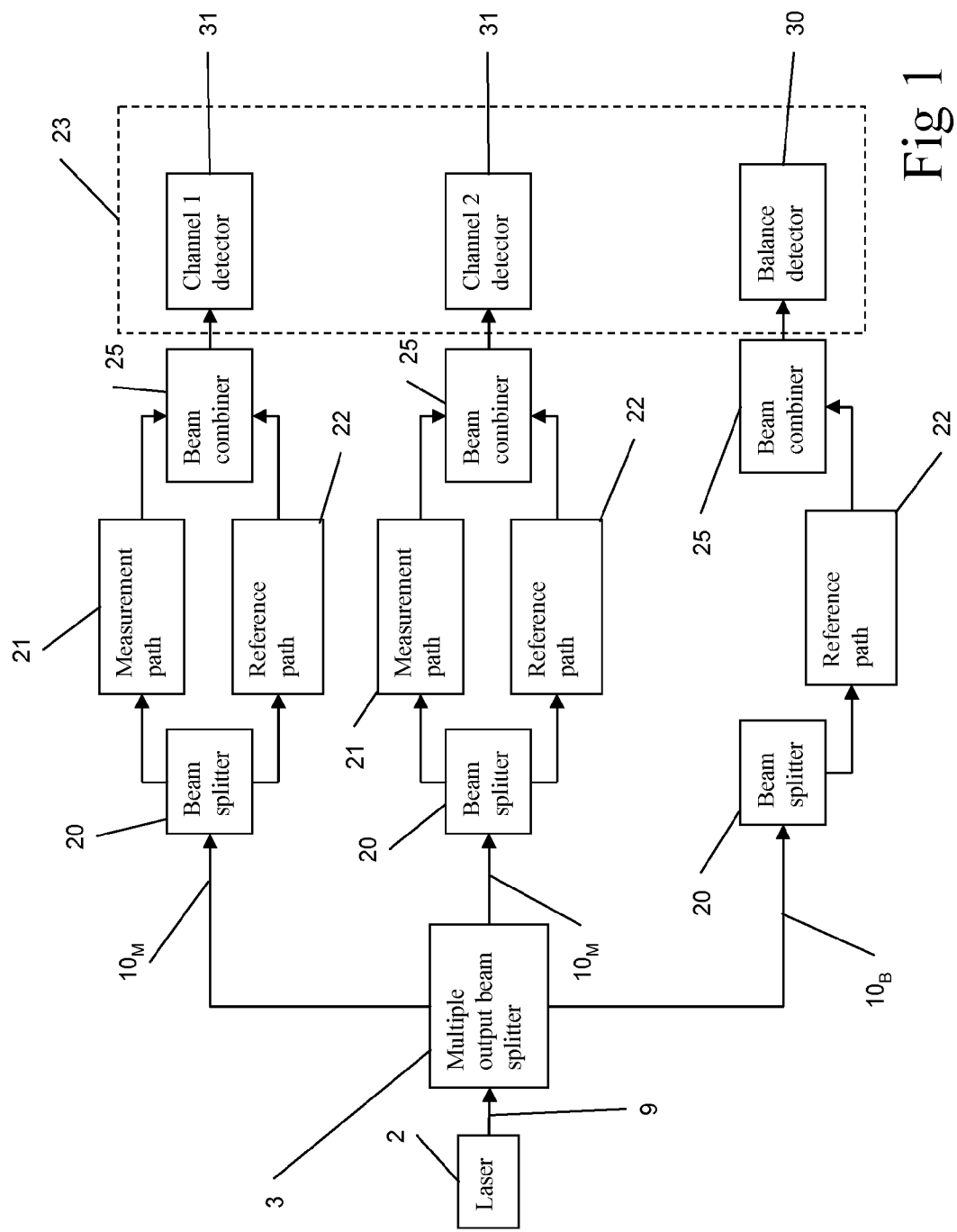

(35) configured to vary the variable level of gain dependent upon a low frequency component of the output of the difference circuit (38).

19 Claims, 2 Drawing Sheets

(52) U.S. Cl.
CPC ..... *G01B 9/02041* (2013.01); *G01B 9/02087* (2013.01); *G01B 9/02091* (2013.01); *G01B 2290/45* (2013.01)

(56) References Cited

U.S. PATENT DOCUMENTS

2008/0192236 A1* 8/2008 Smith ................. A61B 1/303
356/73
2011/0228280 A1* 9/2011 Schmitt ............... H03G 3/3084
356/479

OTHER PUBLICATIONS

United Kingdom Intellectual Property Office Search Report for GB1114330.2 dated Nov. 14, 2011.

* cited by examiner

MULTIPLE MEASUREMENT CHANNEL DETECTOR CIRCUIT FOR INTERFEROMETERS

CROSS-REFERENCE TO RELATED APPLICATIONS

This application is a U.S. national stage application under 35 U.S.C. 371 of International Application No. PCT/GB2012/051923 filed on Aug. 8, 2012 and entitled DETECTOR CIRCUITS FOR INTERFEROMETERS, which in turn claims priority to Great Britain Patent Application No. 1114330.2, filed on Aug. 19, 2011, which is incorporated by reference herein in its entirety for all purposes.

This invention relates to interferometers and to detector circuits therefor.

Internal medical examinations are typically carried out using an endoscope in which the eye or a CCD (charge coupled device) camera images the view relayed from the distal end of a shaft of a probe, thereby viewing the surface of the tissue adjacent to the probe end. It is often desirable to obtain a cross-sectional image from within the tissue, rather than just the surface. Optical coherence Tomography (OCT) has been proposed as a technique that can provide such a capability.

OCT is based on the use of interferometry, where light in the measurement arm of an interferometer is passed to the object to be examined and a portion is scattered back to the interferometer. Light in the reference arm is passed to a mirror at a known distance and a reference beam is reflected back. The scattered measurement beam and the reflected reference beam are combined and the interference between the two beams is detected and used to provide data about the examined object.

Thus, optical coherence tomography uses interferometry and the coherence properties of light to obtain depth-resolved images within a scattering medium, providing penetration and resolution which cannot be achieved using confocal microscopy alone. Clinically useful cross-sectional images of the retina and epithelial tissues have been obtained to a depth of 2-3 mm.

At any given time, a single beam of light is restricted to being in sharp focus only over a certain range—the so-called depth of focus, equal to twice the Rayleigh range. In the PCT patent application published as WO2006/054116, it has been proposed to transmit multiple beams with different focal distances so as to spread this range out and to produce composite images with an increased depth of field.

Where the light for the multiple beams is provided from a common source, as is most convenient, such as a laser, then optical means such as an amplitude beam splitter may be provided to generate a plurality of beams. In WO2006/054116, a "rattle plate" is disclosed, which comprises a parallel-sided glass plate positioned at an angle to the perpendicular relative to the incoming light beam.

Classical light sources exhibit two types of intensity noise. Shot noise is the result of the production of light quanta according to Poisson statistics, and is proportional to the square root of the intensity. Excess noise comes from instability of the light source, and is proportional to the intensity. In sensitive optical systems using laser light sources, balanced detection is routinely used to reduce the effect of excess noise. Shot noise cannot be corrected in this way because the arrival times of photons at different detectors are uncorrelated.

In the simplest balanced arrangement, a pair of photodiode detectors is used. One detector receives light which is modulated by the signal of interest, the other receives unmodulated light direct from the laser source. Each detector produces a current proportional to the incident light. The subtraction of the two photodiode currents at the input to the transimpedance amplifier eliminates the common noise, provided that the photodiodes are matched, and provided that the optical system is carefully adjusted so that they receive equal average optical power.

In the U.S. Pat. No. 5,134,276, a circuit is disclosed which actively adjusts the relative gain to remove any balancing error. In this design, a rather larger amount of optical power is directed to the balance detector element, and the excess current is discarded by a variable current splitter. A feedback circuit continuously adjusts the current split ratio to drive the average output towards zero, achieving balance.

The feedback circuit control loop has a characteristic bandwidth. Signals which are of significantly lower frequency than this bandwidth, down to zero frequency, are taken as gain drift and are compensated for by adjusting the split ratio. Signals of significantly higher frequency are taken as measurement signals and do not affect the split ratio. If the laser output is essentially constant, the control loop bandwidth can be set quite low, typically around 10 Hz.

In both cases, subtraction of equal photocurrents has the disadvantage of doubling the shot noise power, equivalent to a 3 dB increase in noise floor. However, Hobbs declares a variant of his circuit where the optical power onto the balance detector is increased by a factor, and the photocurrent from it attenuated by the same factor. A factor of 4 reduces the shot noise penalty to only 1 dB.

However, swept source OCT has become increasingly prevalent, where the light source is swept in wavelength. Such systems can introduce significant wavelength-dependent variations in both the output of the laser and the response of the optical systems used within the OCT apparatus.

According to a first aspect of the invention, there is provided a detector circuit for a multi-channel interferometer, comprising:
- a plurality of measurement channels each comprising a measurement detector; and
- a balance channel comprising a balance detector,
- each of the measurement detectors and the balance detector having a light sensitive area and an electrical output configured to output a signal indicative of the intensity of light incident on the light sensitive area,
- in which each measurement channel is provided with a feedback circuit comprising:
- a variable gain circuit having an input for the signal from the measurement detector and an output, the variable gain circuit being configured to output at its output the signal received at its input with a variable level of gain;
- a difference circuit having a first input for the output of the variable gain circuit, a second input for the signal from the balance detector and an output, and being configured to output at its output a signal indicative of a difference in the signals at its first and second inputs; and
- a controller for each variable gain circuit configured to vary the variable level of gain dependent upon a low frequency component of the output of the difference circuit.

Thus, by providing a feedback circuit on each measurement channel, the detector can apply a single balance signal to multiple channels, thus suppressing noise and reducing the number of detectors required. The output of the difference circuit represents the light intensity incident on the relevant measurement detector, with a noise correction applied.

Typically, at least some, and typically all of the measurement detectors and the balance detector will be configured such that the signal from the detector comprises an electrical current flowing at the electrical output which indicates the intensity of light incident on the light sensitive area. In such a case, each of the measurement channels may further comprise a transimpedance amplifier interposed between the electrical output and the first input to the difference circuit; similarly, the balance channel may be provided with a transimpedance amplifier interposed between the electrical output and the second input of each difference circuit. The transimpedance amplifiers will typically convert the current flowing at the electrical output into a voltage signal; it is significantly easier to operate on voltage-based signals than current-based signals when applying gain, delays and offsets and so on.

Each channel may be provided with an adjustment stage, which allows for the adjustment of at least one of the offset, gain or delay of the signal from the detector. Typically, the adjustment will be manual. The adjustment of the offset will typically be such that a substantially zero electrical signal is output from the detector channel when no light falls upon the light sensitive area. The adjustment of the gain will typically be such that amplitudes of the signals output from the detectors are roughly equal. The adjustment of the delay will typically be such that a time delay difference between the signals output from the measurement and balance detectors is minimized, as determined by improved noise cancellation.

The controller of each feedback circuit may be configured so as to control the variable level of gain so as to equalise the amplitude of a low frequency component of the signal from each of the difference circuits. Typically, the variable gain circuits will act to amplify their input signals to produce their output signals. This means that the amplitudes of all signals concerning the measurement beams will be brought to the same level.

By low frequency component, we may mean a component of lower frequency than any desired measurement signal. Typically, the low frequency component will comprise the component of the signal from zero frequency up to a cutoff frequency. The cutoff frequency may be around 10 Hertz (Hz) where a constant frequency light source is used; where a variable wavelength light source, and in particular a swept source light source is used, the cutoff frequency will typically be higher than the frequency of the wavelength sweep, typically by around a factor of ten. In the latter case, the cutoff may be at least 20 kHz or 200 kHz. The low frequency component may be determined with a low-pass filter.

Each difference circuit may be configured such that the signal output at its output is indicative of the instantaneous difference in the amplitude of the signals at its first and second outputs. Each difference circuit may comprise an amplifier, typically a differential amplifier. The amplifier may be configured so as to amplify signals input at the first and second inputs and to output the amplified signals, typically as an amplified difference signal, at the output of the difference circuit.

The balance channel may be provided with an attenuator (typically a fixed attenuator), configured to reduce the amplitude of the signal output from the balance detector by an amount, the amount typically corresponding to the increase in light power provided by the optics. Typically, the amount will be around a factor of 4. This allows a balance beam which is stronger than the measurement beam to be used, which has been found to reduce the shot noise.

Typically, at least some, if not all of the following components are identical in the measurement channels and the balance channel:
variable gain circuit;
detector;
transimpedance amplifier; and
adjustment stage.

This tends to ensure that frequency and time responses are well-matched for accurate balancing.

According to a second aspect of the invention, there is provided a multiple beam interferometer comprising:
a multiple beam source, the source being arranged so as to provide, in use, a plurality of beams of light, the beams comprising a plurality of measurement beams and a balance beam;
a detector circuit according to the first aspect of the invention; and
a system of optical components arranged so as to transmit the plurality of beams from the multiple beam source to the detector circuit such that each of the measurement beams falls upon the light sensitive area of a different measurement detector and the balance beam falls upon the light sensitive area of the balance detector.

Typically, the multiple beam source will comprise a swept wavelength light source, whereby the measurement and balance beams vary cyclically and simultaneously in wavelength, at a sweep frequency. In such a case, each feedback circuit may have a control loop bandwidth which controls the speed with which the feedback circuit can react to changes in its inputs.

Typically, the control loop bandwidth will be higher than the sweep frequency, typically by a factor of two, five or ten, such that the feedback circuit can respond to changes in the low frequency component of the difference between the signals output from the measurement detector and the balance detector within a cycle of the swept wavelength light source. This will allow compensation to be made for the varying spectral response of the interferometer with wavelength. Typically, the sweep frequency will be at least 10 or 20 kHz, whereas the control loop bandwidth will be at least 100 or 200 kHz.

Preferably, the multiple beam source is arranged such that the balance beam is of higher amplitude than any of the measurement beams. This can reduce the shot noise penalty of balancing.

The interferometer may be that of an optical coherence tomography device.

According to a third aspect of the invention, there is provided a method of using a detector for a multi-channel interferometer, the detector comprising:
a plurality of measurement channels each comprising a measurement detector; and
a balance channel comprising a balance detector,
each of the measurement detectors and the balance detector having a light sensitive area and an electrical output configured to output a signal indicative of the intensity of light incident on the light sensitive area,
in which each measurement channel is provided with a feedback circuit comprising:
a variable gain circuit having an input for the signal from the measurement detector and an output, the variable gain circuit being configured to output at its output the signal received at its input with a variable level of gain; and a difference circuit having a first input for the output of the variable gain circuit, a second input for the signal from the balance detector and an output, and being configured to output at its output a signal indicative of a difference of the signals at its first and second inputs;

the method comprising controlling the variable level of gain for each variable gain circuit dependent upon a low frequency component of the output of the difference circuit.

The method may comprise controlling the variable level of gain so as to equalise the amplitude of a low frequency component of the output of each of the difference circuits. This means that the amplitudes of all signals concerning the measurement beams will be brought to the same level.

By low frequency component, we may mean a component of lower frequency than any desired measurement signal. Typically, the low frequency component will comprise the component of the signal from zero frequency up to a cutoff frequency. The cutoff frequency may be around 10 hertz (Hz) where a constant frequency light source is used; where a variable wavelength light source, and in particular a swept source light source is used, the cutoff frequency will typically be higher than the frequency of the wavelength sweep, typically by around a factor of ten. In the latter case, the cutoff may be at least 20 kHz or 200 kHz. The low frequency component may be determined with a low-pass filter.

Where each measurement channel is provided with an adjustment stage, which allows for the adjustment of at least one of the offset, gain or delay of the output of the detector, the method may comprise the step of adjusting the adjustment stage so that a substantially zero electrical signal is output from the detector when no light falls upon the light sensitive area. The adjustment of the offset will typically be such that a substantially zero electrical signal is output from the detector channel when no light falls upon the light sensitive area. The adjustment of the gain will typically be such that amplitudes of the signals output from the detectors are roughly equal. The adjustment of the delay will typically be such that a time delay difference between the signals output from the measurement and balance detectors is minimized, as determined by improved noise cancellation.

According to a fourth aspect of the invention, there is provided a method of using a multiple beam interferometer, the interferometer being in accordance with the second aspect of the invention, in which the detector is operated in accordance with the method of the third aspect of the invention.

The method may comprise varying cyclically the wavelength of the measurement and balance beams at a sweep frequency. In such a case, each feedback circuit may have a control loop bandwidth which controls the speed with which the feedback circuit can react to changes in its inputs.

Typically, the control loop bandwidth will be higher than the sweep frequency, typically by a factor of two, five or ten, such that the feedback circuit can respond to changes in the low frequency component of the difference between the balance detector and measurement detector outputs within a cycle of the swept wavelength light source. This will allow compensation to be made for the varying spectral response of the interferometer with wavelength. Typically, the sweep frequency will be at least 10 or 20 kHz, whereas the control loop bandwidth will be at least 100 or 200 kHz.

Preferably, the method comprises providing the balance beam of higher amplitude than any of the measurement beams. This can reduce the shot noise penalty of balancing. Typically, the balance beam will be at least twice, if not at least three or four times, the amplitude of the measurement beams as incident on the light sensitive areas.

The interferometer may be that of an optical coherence tomography device, typically a swept source optical coherence tomography device.

Figure 2:
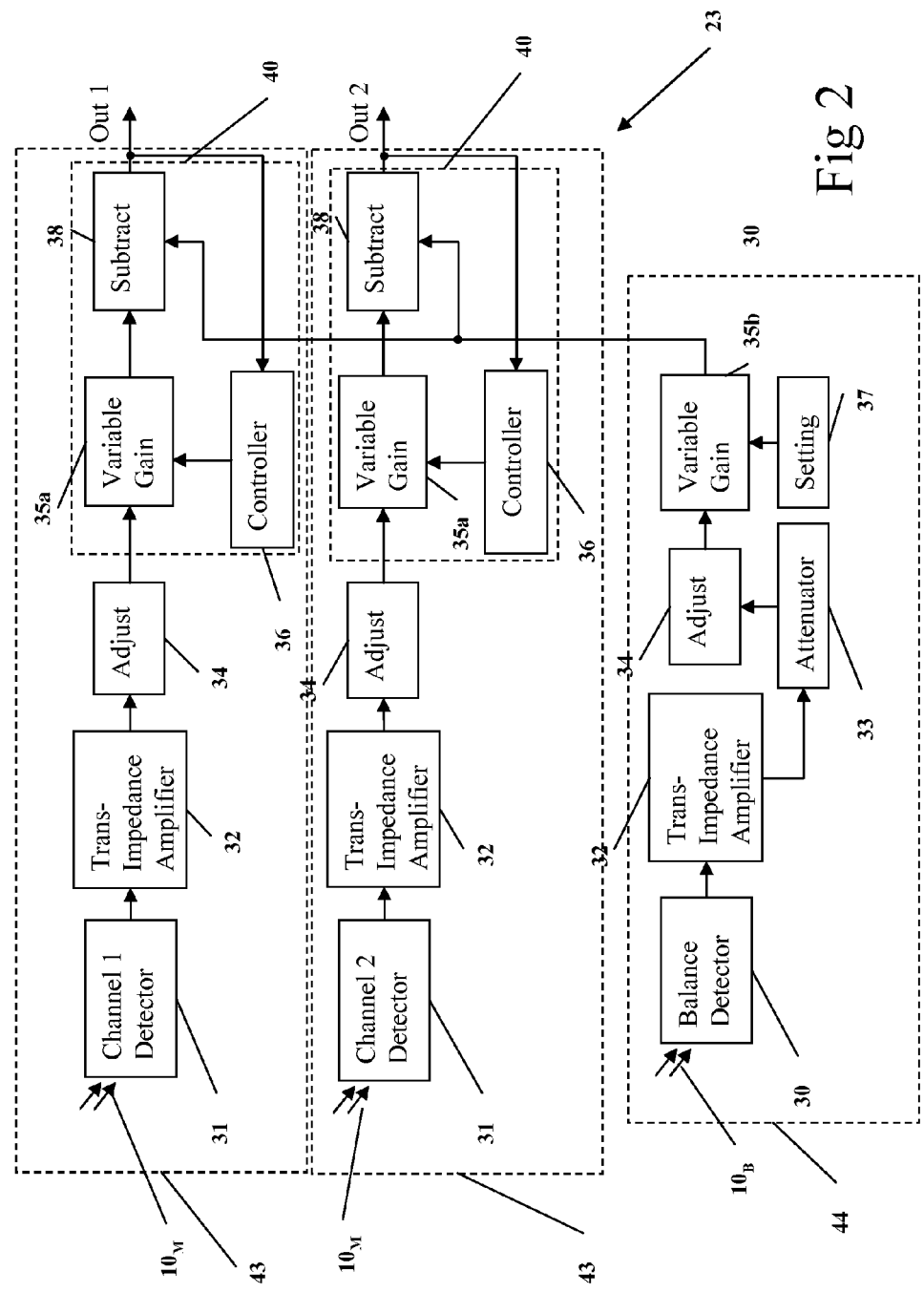

There now follows, by way of example only, an embodiment of the invention described with reference to the accompanying drawings, in which:

FIG. 1 shows a schematic view of an interferometer used in an optical coherence tomography device, in accordance with an embodiment of the invention; and FIG. 2 shows a schematic view of the detector used in the interferometer of FIG. 1.

FIGS. 1 and 2 of the accompanying drawings show an interferometer as used in an optical coherence tomography device, in accordance with an embodiment of the invention. Whilst the example below is described without reference to the optical system in which it is embodied, the embodiment could equally well be used with any suitable optical arrangement, such as in optical fibre, or in free space using the components suggested in WO2006/054116.

The interferometer comprises a light source 1. This comprises a swept frequency laser light source 2, which is arranged to emit an input beam of light 9. The wavelength of the beam of light 9 is cyclically varied, typically in a sawtooth pattern, with a frequency of around 20 kHz.

The input beam of light 9 transmitted to a beamsplitter 3, which splits the input beam 9 into a plurality of measurement beams $10_M$ (two shown in FIG. 1, but any number could be used) and a balance beam $10_B$. The balance beam is stronger than the other beams.

Each of these beams $10_M$, $10_B$ are passed to a respective beam splitter 20, which splits the respective beam in two. The split measurement beams $10_M$ are passed onto two different optical paths; the first, a measurement path 21 includes reflection off the bodily part it is desired to examine. The second optical path, the reference path 22, is of substantially the same length as the measurement path 21. The balance beam is split, and one of the split beams traverses the reference path 22, whereas the split beam that would have, in a measurement channel, traversed the measurement path is discarded.

Each pair of split measurement beams are recombined at a combiner 25 and the beams are allowed to interfere; similarly, the balance beam is passed through a combiner 25 but does not have a split version with which to combine. Each of the recombined beams and the balance beam $10_M$, $10_B$ is detected in the detector circuit 23 in a separate channel. From this, in the manner described in WO 2006/054116, the structure of the bodily part can be detected.

The balance beam splitter and combiner may or may not be present depending on convenience of implementation. Depending on the type of interferometer used, the splitter and combiner may be the self-same optical component.

The detector circuit can be seen in more detail in FIG. 2 of the accompanying drawings. Each beam $10_M$, $10_B$ has its own detector or balance channel 43, 44.

Each channel 43, 44 comprises a detector 31, 30. Detectors 31, 30 are reverse-biased photodiodes, all of the same type; each has a light sensitive area on which the relevant beam $10_M$, $10_B$ is incident. The mean light power onto balance detector 30 is arranged to be about four times that onto each of the measurement detectors 31, and an attenuator 33 in the balance channel 44 correspondingly reduces the balance signal by a factor of four. This improves the shot noise as seen at the output by 2 dB compared to balancing with equal powers. Attenuator 33 is implemented with small fixed resistors, giving it a flat frequency response and introducing negligible delay.

Each of the measurement 43 and balance 44 channels comprises a transimpedance amplifier 32 connected to each photodiode 31, 30. The design of the transimpedance stages is such that the frequency response is relatively insensitive to the photodiode capacitance and no adjustment is needed for stability. Together with wide bandwidth, these characteristics help achieve accurate matching.

Each signal passes though adjustment stage 34 within each channel 43, 44, where offset, gain and delay can be manually trimmed for best performance. Any significant voltage offset will affect the balancing accuracy, so an offset adjustment is used to take out any electronic offset which remains when the light beams $10_M$, $10_B$ are blocked from the detectors 31, 30. The gain adjustment allows the signals to be adjusted to approximate equality, so that the auto-balancing circuits will operate around the middle of their control ranges. The delay adjustment allows compensation for differing path-lengths in an optical system, which would otherwise degrade the cancellation of excess noise particularly at higher frequencies. A single active stage is able to accurately compensate a time difference of up to 2.5 ns (750 mm in air or 500 mm in glass fibre) over a bandwidth of 40 MHz.

Noise correction is applied in each measurement channel 43 by a feedback circuit 40 comprising variable gain 35, subtractor 38 and controller 36. The variable gain scales the measurement signal to equal the fixed balance rather than the other way round, which has the advantage of locking the gains of all the channels together. To ensure accurate matching of the balance signal over the frequency range, the balance signal also passes through identical variable gain stage 35 in the balance channel 44, but in this case set to a constant mid gain by setting 37. Variable gain 35 consists of a variable attenuator, using an N-channel JFET as a variable resistor, followed by a fixed gain. Subtractor 38 is a differential amplifier, which also applies some additional gain.

For an application using a wavelength-swept laser 2, where the signals of interest might be only a factor of 10 above the variations in balance that the feedback circuit 40 is required to track, a relatively complex filter is required. The controller needs a higher gain at lower frequencies so as to track accurately, but also needs a lower gain at higher frequencies to avoid modulating the variable gain and causing second harmonic distortion of the measurement signal.

The measurement signal itself, with the excess noise in particular due to variation of amplitude of the laser 2 removed, is output as the output of the subtractor 38. As the low frequency variations in the laser amplitude have been removed, the low frequency amplitude of the balance signal and the output of the variable gain will be the same, leaving only the measurement signal—the interferogram due to interference of the measurement and reference signals—at the output of the subtractor.

The invention claimed is:

1. A detector circuit for a multi-channel interferometer, comprising:
    a plurality of measurement channels each comprising a measurement detector; and
    a balance channel comprising a balance detector, each of the measurement detectors and the balance detector having a light sensitive area and an electrical output configured to output a signal indicative of the intensity of light incident on the light sensitive area, light incident on the balance detector not having been combined with measurement channel light, in which each measurement channel is provided with a feedback circuit comprising:
    a variable gain circuit having an input for the signal from the measurement detector and an output, the variable gain circuit being configured to output at its output the signal received at its input with a variable level of gain;
    a difference circuit having a first input for the output of the variable gain circuit, a second input for the signal from the balance detector and an output, and being configured to output at its output a signal indicative of a difference between the signal from the balance detector and the output of the variable gain circuit; and
    a controller for each variable gain circuit, disposed to receive the signal indicative of the difference between the signal from the balance detector and the output of the variable gain circuit and to provide an output of the controller to the variable gain circuit; thereby completing a feedback loop in the feedback circuit; the controller being configured to vary the variable level of gain dependent upon to low frequency component of the output of the difference circuit.

2. The detector of claim 1, in which the measurement detectors and the balance detector are configured such that the signal from the detector comprises an electrical current flowing at the electrical output which indicates the intensity of light incident on the light sensitive area and each of the measurement channels comprises a transimpedance amplifier interposed between the electrical output and the first input to the difference circuit; and the balance channel comprises a transimpedance amplifier interposed between the electrical output and the second input of each difference circuit, the transimpedance amplifiers being configured so as to convert the electrical current forming the signal from the detector into a voltage signal.

3. The detector of claim 1, in which the controller of each feedback circuit is configured so as to control the variable level of gain so as to equalise the amplitude of a low frequency component of the signal from each of the difference circuits.

4. The detector of claim 1, in which the balance channel is provided with an attenuator, configured to reduce the amplitude of the signal from the balance detector by an amount.

5. The detector claim 1, in which each channel is provided with an adjustment stage, which allows for the adjustment of at least one of the offset, gain or delay of the signal from the detector.

6. The detector of claim 1, in which at least some or all of the following components are identical in the measurement detectors on the one hand and the balance detector on the other: variable gain circuit; detector; transimpedance amplifier; and adjustment stage.

7. A multiple beam interferometer comprising:
    a multiple beam source, the source being arranged so as to provide, in use, a plurality of beams of light, the beams comprising a plurality of measurement beams and a balance beam;
    a detector circuit according to claim 1; and
    a system of optical components arranged so as to transmit the plurality of beams from the multiple beam source to the detector circuit such that each of the measurement beams falls upon the light sensitive area of a different measurement detector and the balance beam falls upon the light sensitive area of the balance detector.

8. The interferometer of claim 7, in which the multiple beam source comprises a swept wavelength light source, whereby the measurement and balance beams vary cyclically and simultaneously in wavelength, at a sweep frequency, each feedback circuit having a control loop bandwidth which controls the speed with which the feedback circuit can react to changes in its inputs, the control loop bandwidth being higher than the sweep frequency.

9. The interferometer of claim 7, in which the multiple beam source is arranged such that the balance beam is of higher amplitude than any of the measurement beams.

10. The multiple beam interferometer of claim 7, wherein the multiple beam interferometer is an optical coherence tomography device.

11. A method of operating a multiple beam interferometer, the interferometer being in accordance with claim 7, in which the detector is used as a detector of a multi-channel interferometer and the detector comprises:
  a plurality of measurement channels each comprising a measurement detector; and
  a balance channel comprising a balance detector, each of the measurement detectors and the balance detector having a light sensitive area and an electrical output configured to output a signal indicative of the intensity of light incident on the light sensitive area, light incident on the balance detector not having been combined with measurement channel light, in which each measurement channel is provided with a feedback circuit comprising:
    a variable gain circuit having an input for the signal from the measurement detector and an output, the variable gain circuit being configured to output at its output the signal received at its input with a variable level of gain;
    a difference circuit having a first input for the output of the variable gain circuit, a second input for the signal from the balance detector and an output, and being configured to output at its output a signal indicative of a difference of the signals at its first and second inputs; and
    a controller for each variable gain circuit, the controller being disposed to receive the signal indicative of the difference between the signal from the balance detector and the output of the variable gain circuit and to provide an output of the controller to the variable gain circuit; thereby completing a feedback loop in the feedback circuit;
  the method comprising:
  controlling the variable level of gain for each variable gain circuit dependent upon a low frequency component of the output of the difference circuit; and
  varying cyclically the wavelength of the measurement and balance beams at a sweep frequency, each feedback circuit having a control loop bandwidth which controls the speed with which the feedback circuit can react to changes in its inputs, the control loop bandwidth being higher than the sweep frequency.

12. A method of operating a multiple beam interferometer; the interferometer being in accordance with claim 7, and the detector comprises:
  a plurality of measurement channels each comprising a measurement detector;
  a balance channel comprising a balance detector, each of the measurement detectors and the balance detector having a light sensitive area and an electrical output configured to output a signal indicative of the intensity light incident on the light sensitive area, in which each measurement channel is provided with a feedback circuit that comprises a variable gain circuit having an input for the signal from the measurement detector and an output, the variable gain circuit being configured to output at its output the signal received at its input with a variable level of gain; and
  a difference circuit having a first input for the output of the variable gain circuit, a second input for the signal from the balance detector and an output, and being configured to output at its output a signal indicative of a difference of the signals at its first and second inputs;
  the method comprising:
  controlling the variable level of gain for each variable gain circuit dependent upon a low frequency component of the output of the difference circuit; and
  providing the balance beam of higher amplitude than any of the measurement beams.

13. The method of claim 12, in which the balance beam is at least twice, three or four times the amplitude of the measurement beams as incident on the light sensitive areas.

14. A method of using a detector of a multi-channel interferometer, wherein the detector comprises:
  a plurality of measurement channels each comprising a measurement detector; and
  a balance channel comprising a balance detector, each of the measurement detectors and the balance detector having a light sensitive area and an electrical output configured to output a signal indicative of the intensity of light incident on the light sensitive area, light incident on the balance detector not having been combined with measurement channel light, in which each measurement channel is provided with a feedback circuit comprising:
    a variable gain circuit having an input for the signal from the measurement detector and an output, the variable gain circuit being configured to output at its output the signal received at its input with a variable level of gain;
    a difference circuit having a first input for the output of the variable gain circuit, a second input for the signal from the balance detector and an output, and being configured to output at its output a signal indicative of a difference of the signals at its first and second inputs; and
    a controller for each variable gain circuit, the controller being disposed to receive the signal indicative of the difference between the signal from the balance detector and the output of the variable gain circuit and to provide an output of the controller to the variable gain circuit; thereby completing a feedback loop in the feedback circuit;
  the method comprising controlling the variable level of gain for each variable gain circuit dependent upon a low frequency component of the output of the difference circuit.

15. The method of claim 14, comprising controlling the variable level of gain so as to equalise the amplitude of a low frequency component of the signal from each of the difference circuits.

16. The method of claim 14, in which each measurement channel is provided with an adjustment stage, which allows for the adjustment of at least one of the offset, gain or delay of the signal from the measurement detector.

17. The method of claim 16, wherein the adjustment stage allows for the adjustment of the offset of the signal from the measurement detector, the method further comprising t adjusting the adjustment stage so that a substantially zero electrical signal is output from the measurement detector when no light falls upon the light sensitive area.

18. The method of claim 16, wherein the adjustment stage allows for the adjustment of the gain of the signal from the measurement detector, the method further comprising adjusting the gains of the signals from the measurement detectors such that the signals from the measurement detectors are substantially equal.

19. The method of claim 16, wherein the adjustment stage allows for the adjustment of the delay of the signal from the measurement detector, the method further comprising adjusting the delay of the signals from the measurement detectors such that a time delay difference between the signals output from the measurement and balance detectors is minimized.

\* \* \* \* \*